United States Patent
Yamada

(10) Patent No.: US 7,158,309 B2
(45) Date of Patent: Jan. 2, 2007

(54) GLASS OPTICAL ELEMENT AND METHOD FOR PRODUCING THE SAME

(75) Inventor: Kei Yamada, Tokyo (JP)

(73) Assignee: Nippon Sheet Glass Company, Limited, Tokyo (JP)

(*) Notice: Subject to any disclaimer, the term of this patent is extended or adjusted under 35 U.S.C. 154(b) by 0 days.

(21) Appl. No.: 11/245,172

(22) Filed: Oct. 7, 2005

(65) Prior Publication Data

US 2006/0077561 A1   Apr. 13, 2006

(30) Foreign Application Priority Data

Oct. 12, 2004   (JP) .................. P2004-297953

(51) Int. Cl.
  *G02B 3/00*   (2006.01)
(52) U.S. Cl. ................................. 359/652
(58) Field of Classification Search ........ 359/652–654, 359/619, 620
  See application file for complete search history.

(56) References Cited

U.S. PATENT DOCUMENTS 4,509,824 A * 4/1985 Yamasaki et al. ........... 359/619
4,518,222 A * 5/1985 Borrelli et al. ............. 359/620
4,844,589 A * 7/1989 Asahara et al. ............. 359/652
6,816,319 B1 * 11/2004 Tsuda et al. ................ 359/652

FOREIGN PATENT DOCUMENTS

| JP | 58-2243 | 1/1983 |
| JP | 60-260445 | 12/1985 |
| JP | 11-171599 | 6/1999 |

* cited by examiner

*Primary Examiner*—Scott J. Sugarman
*Assistant Examiner*—Mohammed Hasan
(74) *Attorney, Agent, or Firm*—Whitham, Curtis, Christofferson & Cook, P.C.

(57) ABSTRACT

The invention provide a glass optical element which contains an alkaline metal oxide and an alkaline earth metal oxide, comprising an end portion that contains a fluoride ion or a fluorine compound on or in a vicinity of an exposed surface of the glass optical element. The end portion containing the fluoride ion or the fluorine compound is formed by contacting the surface with hydrofluoric acid. A rod lens array is fabricated by arranging a plurality of graded index rod lenses as glass optical elements of the invention. The weather resistance of the element or the lens array can be improved by the above treatment.

8 Claims, 4 Drawing Sheets

GLASS OPTICAL ELEMENT AND METHOD FOR PRODUCING THE SAME

BACKGROUND OF THE INVENTION

1. Field of the Invention

The present invention relates to an optical device comprising a constitutive element of glass, and in particular, to a technique of improving the weather resistance of the optical device.

2. Related Art

Glass that contains an alkaline metal undergoes a phenomenon that the alkaline metal deposits on the surface thereof owing to the diffusive movement of the alkaline metal ions. The deposited alkaline metal may form a salt and adhere to the glass surface, or an alkaline metal component may dissolve out on the glass surface and the structure of the glass surface may change. This phenomenon is more remarkable in a high-temperature high-humidity environment (for example, in an environment at a temperature of 80° C. and a humidity of 90% RH), and this maybe a factor of worsening the weather resistance of glass in optical applications. The following three techniques are mainly known for preventing the phenomenon and for improving the weather resistance of glass:

(1) Heat treatment: This is surface modification of glass, comprising heating glass at 150° C. or higher so as to previously release alkaline and other monovalent ions (e.g., see JP-A 58-2243).

(2) Ion-exchange treatment: This is surface modification of glass, comprising dipping glass in a metal ion-containing molten salt to thereby exchange the readily-releasable metal ion in the glass with a metal ion not readily releasable even at high temperatures, and this is for imparting metal ion release resistance to glass (e.g., see JP-A 58-2243 and JP-A 60-260445).

(3) Chemical treatment: This is surface modification of glass, comprising contacting glass with warm water or with an aqueous acid solution to thereby release the alkaline metal ion that exists in a vicinity of the glass surface (e.g., see JP-A 11-171599).

The weather resistance test of glass lenses made by the present inventors has revealed that divalent alkaline earth metal ions may also deposit in a high-temperature high-humidity environment. However, divalent alkaline earth metal ions are difficult to release by heat treatment.

In ion-exchange treatment, glass members may be cracked, or may be deformed or deteriorated. Chemical treatment is also problematic in that glass members may be cracked through it.

SUMMARY OF THE INVENTION

The invention has been made to solve the above-mentioned problems, and its object is to provide a glass optical element having good weather resistance, in which alkaline metal and alkaline earth metal are prevented from being released from glass. Another object of the invention is to provide a method for producing such a glass optical element in which alkaline metal and alkaline earth metal are prevented from being released from glass.

The glass optical element of the invention is containing at least one alkaline metal oxide and at least one alkaline earth metal oxide. In the glass optical element, an end portion that contains a fluoride ion or a fluorine compound is provided on or in the vicinity of the exposed surface of the glass optical element that is exposed to the air for preventing release of alkaline metal ion or alkaline earth metal ion from the exposed surface. The end portion that contains the fluoride ion or the fluorine compound may form a protective layer in the optical element.

The protective layer prevents alkaline metal and alkaline earth metal ions from being released from glass, and therefore the glass optical element of the invention has high weather resistance.

The protective layer is effective when the glass optical element is a lens, especially a graded index rod lens and when the layer is formed on the surface of the lens. Accordingly, the invention provides a lens having good weather resistance.

Incidentally, The term "layer" is referred to as an area in the glass that shows a different nature or that contains particular materials relative to other areas.

The invention also provides a rod lens array comprising:

a plurality of rod lenses, each having a center axis with a predetermined length and an end face with a predetermined diameter; and a pair of frames between which the rods lenses are disposed;

wherein the rod lenses are so arranged that the end faces of the rod lenses are on a common plane and the center axes of the rod lenses are in parallel with one another, and the end face of each rod lens is provided with an end portion containing a fluoride ion or a fluorine compound on or in a vicinity of an exposed surface of the glass optical element that is exposed to an air.

The invention therefore provides a graded index rod lens array having good weather resistance. Particularly, in a lens array, end faces of the component lens are required to arranged in a common surface for provide the optical function of the lens array. Accordingly, this surface is often required to be exposed in usual applications of the lens array, such as image-forming apparatus and an image-reading apparatus. It is often difficult to provide a protective film or the like separately on the surface of the lens array. In such a lens array, an alkaline meal component may dissolve out on the glass surface of component lenses that may deteriorate the optical property of the lens.

On the other hand, in the rod lens array of the invention, good weather resistance can be accomplished because the treatment for preventing to release alkaline metal component from the glass surface is performed in each component lenses.

The method of the invention for producing such a glass optical element that contains at least one alkaline metal oxide and at least one alkaline earth metal oxide, comprises contacting at least a surface of the glass optical element that is to be exposed to the air, with hydro fluoric acid or with an acid mixture containing at least hydrofluoric acid.

According to the production method, a fluorine-containing end portion may be formed on or in the vicinity of the glass surface, and therefore there may be provided a glass optical element having high weather resistance, in which alkaline metal and alkaline earth metal ions are prevented from being released from glass. The end portion may provide in a form of a layer.

Preferably, at least the surface of the glass optical element that is exposed to the air is contacted with hydrofluoric acid or with an acid mixture containing at least hydrofluoric acid, and then this is further contacted with another acid. Also preferably, said another acid is any of hydrochloric acid, nitric acid or sulfuric acid, or a mixed acid of any of them.

According to the production method, a fluorine-containing protective layer may be formed on the glass surface, and therefore there may be provided a glass optical element having high weather resistance, in which alkaline metal and alkaline earth metal are prevented from being released from glass.

Preferably, the concentration of hydrofluoric acid is from 0.0005 normality to 1 normality. If the concentration is lower than 0.0005 normality, then a fluorine-containing layer could not be sufficiently formed; but if higher than 1 normality, then glass itself may be corroded.

Preferably, heat treatment at 150° C. or higher is added to the above-mentioned treatment.

According to the production method, a fluorine-containing protective layer may be formed on the glass surface, and therefore there may be provided a glass optical element having higher weather resistance, in which alkaline metal and alkaline earth metal ions are prevented from being released from glass and the alkaline metal concentration in the vicinity of the glass surface may be lowered by the heat treatment. If the heat treatment is at lower than 150° C., then it is ineffective since the alkaline metal movement in glass is impossible at such a low temperature.

The production method is applicable to the glass optical element of a graded index rod lens fabricated by imparting a graded index profile to a mother glass having a uniform composition through ion-exchange treatment. Preferably, the composition of the mother glass is within a range mentioned below in terms of % by mol:

$40 \leq SiO_2 \leq 65$, $1 \leq TiO_2 \leq 10$, $0 \leq MgO \leq 22$, $2 \leq Li_2O \leq 18$, $2 \leq Na_2O \leq 20$, provided that, $6 \leq Li_2O + Na_2O \leq 38$, and any two or more of CaO, SrO and BaO account for from 0.1 mol % to 15 mol % of the composition.

Processing the mother glass of the type according to the process as above gives the glass optical element having good weather resistance of the invention.

Using the graded index rod lens array for forming an image of a light source therein, an image-forming apparatus may be constructed, in which the lens array forms an image on a predetermined image formation surface.

Using the graded index rod lens array for forming an image of an object therein, an image-reading apparatus may be constructed, in which the lens array acts to read the image on a predetermined photodetector.

In the invention, a fluorine-containing protective layer is formed on or in the vicinity of the surface of glass, and therefore alkaline metal and alkaline earth metal are prevented from being released from glass, and, as a result, the invention improves the weather resistance of a glass optical element that contains alkaline metal and alkaline earth metal oxides.

DETAILED DESCRIPTION OF THE PREFERRED EMBODIMENTS

Embodiments of the invention are described hereinunder.

(Method of Surface Protection Treatment)

As one typical example, glass that contains Na as an alkaline metal and Ba as an alkaline earth metal is taken into consideration in the following description. At the surface of glass of this type, the concentration of Na ion (having a high mobility) is high in the vicinity of the surface 10 while the concentration of Ba ions (having a low mobility) is low, as illustrated in FIG. 1A.

In this description, the area interposed between the site at which the Na concentration is the highest and the top surface is referred to as the outermost surface layer 12; the inside area in which both Na and Ba have a constant concentration is referred to as a bulk region 16; and the intermediate region between the two in which both the Na concentration and the Mg concentration vary is referred to as a sub-surface layer 14. The high-concentration Na ions existing in the outer most surface layer 12 are, when contacted with water, readily dissolved out in water, and the surface condition of glass is thereby changed.

Figure 1A:
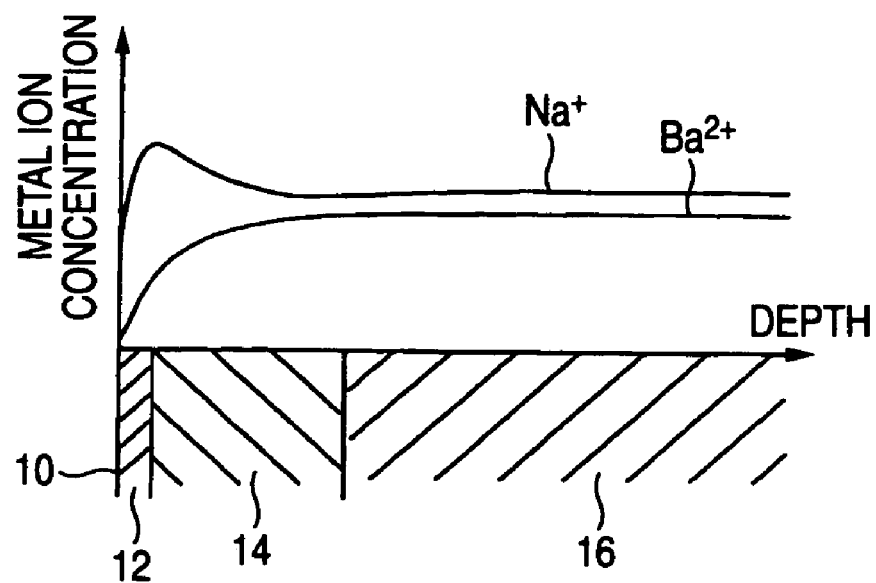
FIGS. 1A and 1B are schematic views showing the condition in the vicinity of the surface of a glass optical element before and after the surface protection treatment of the invention.

An optical device formed of the glass of the type of FIG. 1A will not have sufficient reliability in high-temperature, high-humidity conditions. Therefore, one conventional method for improving the weather resistance of the glass comprises releasing the Na ions from it by heating or treating with acid to thereby reduce the change of glass later on. However, the method is ineffective for alkaline earth metal ions such as Ba ion.

Figure 1B:
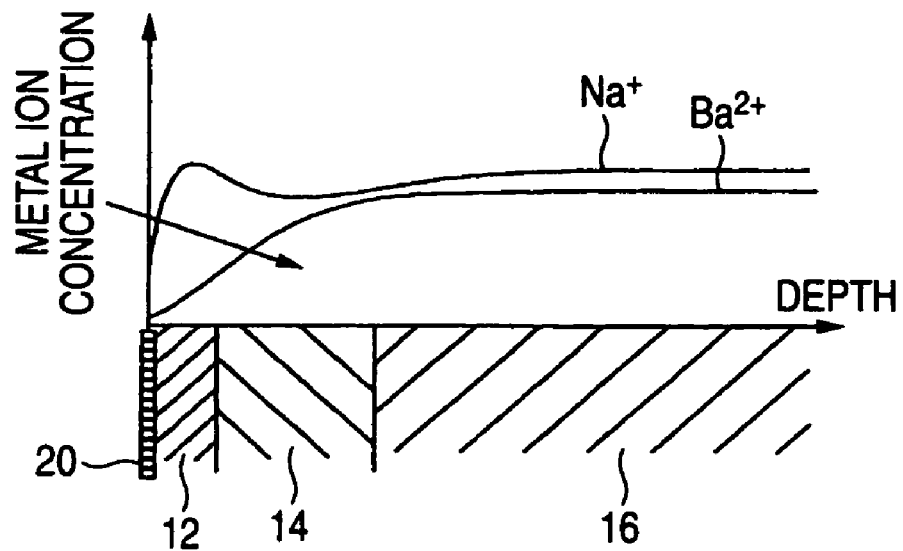

The invention provides a method for preventing ion release. Specifically, in an end portion of the optical device, a protective layer 20 for preventing ion release is formed on the glass surface 10, as illustrated in FIG. 1B. In the present invention, a fluorine-containing layer is formed on the surface of the glass (Glass Optical Element)

An object of the invention is to improve the weather resistance of a glass optical element containing at least one alkaline metal oxide and at least one alkaline earth metal oxide. An embodiment of the invention is described below, in which one example of the glass optical element of the invention is a graded index rod lens of glass or an array of such rod lenses. Needless-to-say, the optical device of the invention should not be limited to the illustrated ones.

The graded index rod lens is a rod-shaped (columnar) glass lens of which the refractive index, n, varies from its center axis toward the radial direction thereof nearly according to the following formula:

$$n(r) = n0 \cdot (1 - (A/2)r^2)$$

wherein r indicates the distance from the center axis of the rod lens toward the radial direction thereof; n0 indicates the refractive index on the center axis; and $\sqrt{A}$ indicates a refractive index distribution constant. The two faces of the column of the rod lens is the light incident and exit faces.

Figure 2:
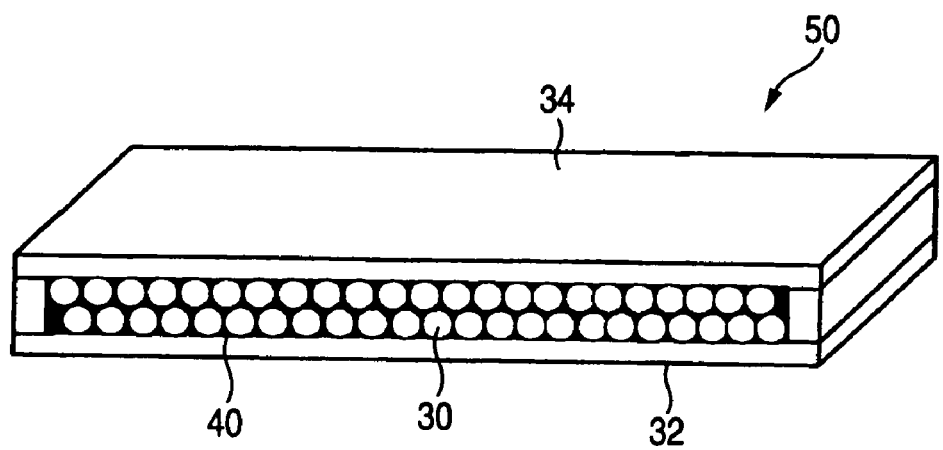
FIG. 2 is a schematic view showing a graded index rod lens.

FIG. 2 shows a graded index rod lens array 50 (this is hereinafter simply referred to as "lens array"). As illustrated, this comprises, as the constitutive elements (optical elements) thereof, a plurality of graded index rod lenses 30 each having a predetermined lens length. In this, the rod lenses are regularly so arranged that their one end faces are on a common plane and their center axes are in parallel with each other. In general, a resin 40 is infiltrated into the space between the adjacent lenses, and the array is fixed as sandwiched between two tabular frames 32 and 34.

The glass optical element of this embodiment is the graded index rod lens array as above, and this comprises, as the optical elements thereof, graded index rod lenses in which the mother glass for each lens is alkaline glass. The composition of the mother glass used in this embodiment comprises 52.0 mol % of $SiO_2$, 4.0% of $B_2O_3$, 3.5 mol % of $TiO_2$, 9.5 mol % of $Li_2O$, 9.0 mol % of $Na_2O$, 14.0 mol % of MgO, 2.0 mol % of BaO, 6.0 mol % of SrO, and additionally contains $ZrO_2$ and $Sb_2O_3$.

When the surface protection of the invention is applied to the graded index rod lens, then the mother glass composition preferred for it is as follows: $SiO_2$ is preferably from 40 to 65 mol %. Regarding alkaline metal oxides, $Li_2O$ is preferably from 2 to 18 mol %, $Na_2O$ is preferably from 2 to 20 mol %, and their total ispreferably from 6 to 38 mol %. Regarding divalent alkaline earth metals, MgO is preferably at most 22 mol %, and at least any two of CaO, SrO and BaO are preferably from 0.1 to 15 mol %. In addition to these, $TiO_2$ is preferably from 1 to 10 mol %.

Two different types of lenses are used herein, one of which has a lens diameter of 600 μm and the other has 300 μm.

The rod lenses are piled up in two stages in a honeycomb arrangement, as in FIG. 2, and these are adhered and fixed between two glass fiber-reinforced resin (FRP) plates. Next, the lenses are cut along with the FRP plates, thereby having a predetermined lens length, and the end faces of the lenses are polished. The process gives the lens array 50 as in FIG. 2. Needless-to-say, the surface protection treatment in the invention does not depend on the number of the rod lenses, the size thereof, the rule of arranging them aRd or the number of their stages.

The lens array forms a unit magnification erect image of a light source, and therefore it may form the image on a predetermined image formation surface. Accordingly, it may be used in an image-forming apparatus such as a photoprinter or in an image-reading apparatus such as a scanner.

Figure 3:
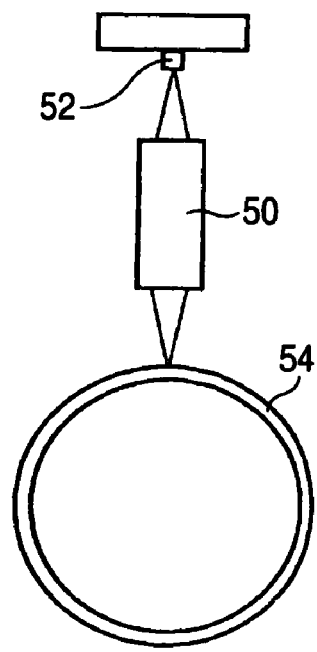
FIG. 3 is a schematic view showing an optical system of an image-forming apparatus.

FIG. 3 is a schematic cross-sectional view of an optical system of an image-forming apparatus, showing a cross section thereof vertical to the lengthwise direction of the lens array 50. As a light source, herein used is a light-emitting diode array 52, and an image of its light-emitting point is formed on the image-forming surface of a photoreceptor drum 54 as a congruent erect dot image, via the lens array 50.

Figure 4:
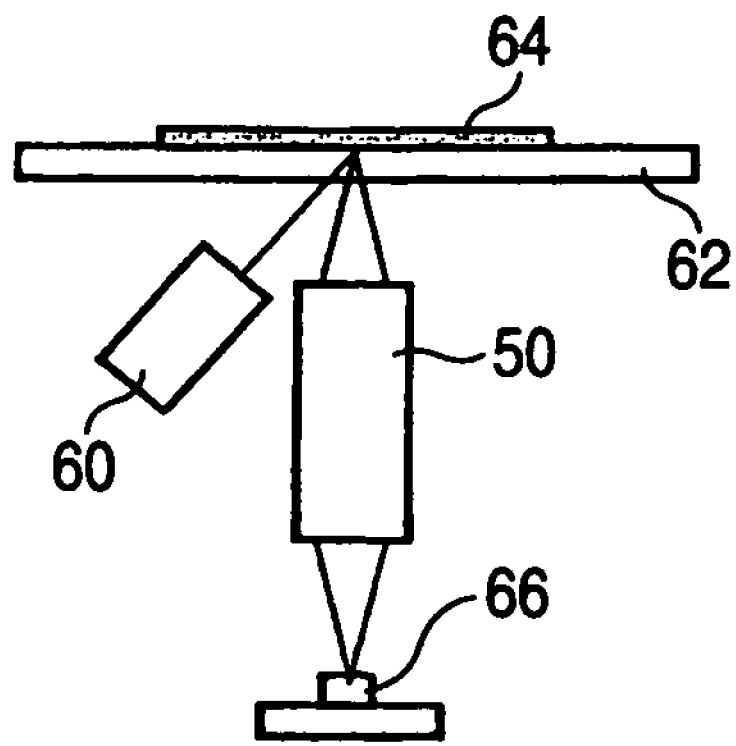
FIG. 4 is a schematic view showing an optical system of an image-reading apparatus.

FIG. 4 is a schematic cross-sectional view of an optical system of an image-reading apparatus. An object (original) 64 put on a transparent glass stand 62 is lighted by a lighting source 60, and its congruent erect image is formed on a photodetector array 66 via the lens array 50, and this is read thereon.

To ensure the long-term reliability of the device, the weather resistance of the constitutive elements of the device must be improved. Of those, the present invention is effective for improving the weather resistance of the glass rod lenses.

As one index of confirming the effect of the invention, used is MTF (modulation transfer function) which is an index of indicating the resolution of a lens array. MTF is determined by incident light having a rectangular periodic intensity distribution profile, and is represented by the following formula:

$$MTF = \{(i(w)\max - i(w)\min)/(i(w)\max + i(w)\min)\} \times 100 \, (\%),$$

wherein i(w)max and i(w)min indicate the maximum value and the minimum value, respectively, of the output quantity of light through a lens array to a rectangular image input at a spatial frequency w (unit: lm (line pair)/mm).

(Weather Resistance Test)

To confirm that the lens array after the treatment as above is improved in point of its weather resistance, it is tested as follows:

After treated, the lens array is kept in an accelerated moisture resistance test environment at a temperature of 80° C. and a humidity of 90% RH for 100 hours, and the degree of optical deterioration of the sample before and after the test is determined and, in addition, the lens surface condition (presence or absence of spots, cracks) after the test is observed with a microscope.

Regarding the optical property of the lens array, MTF thereof is determined at a wavelength of 530 nm or 545 nm under a condition of 12 lm/mm or 6 lm/mm. Regarding the lens surface condition, the lens surface is checked for spots owing to deposition of some substance thereon and for fine cracks. The result is shown in Table 1. Regarding the lens surface condition, "O" is given to the samples with no change after the test, and "x" is given to the samples having some change after the test.

The deterioration in point of MTF is calculated according to the following formula:

$$\text{Deterioration} = (MTF(\text{before test}) - MTF(\text{after test})) / MTF(\text{before test}) \times 100 \, (\%)$$

As total evaluation, the tested samples are grouped into three. Concretely, "OO" is given to the samples of good weather resistance; "O" is given to the samples on an average level with no problem in practical use; and "X" is given to the samples of not good.

Examples and Comparative Examples are given hereinunder. The condition for the treatment and the test result are all shown in Table 1.

EXAMPLE 1

A lens array of rod lenses having a lens diameter of 300 μm was dipped in 0.0005 N hydrofluoric acid (HF) at 25° C. for 5 minutes, at the end faces of the rod lenses therein, and then heated at 160° C. for 20 hours.

As in Table 1 showing the result of this Example, no change was found in the lens surface condition, the deterioration of MTF was 8.1%, and in total evaluation, the lens array has no problem in its practical use.

EXAMPLE 2

The lens array of Example 1 was processed in 0.02 N hydrofluoric acid at 30° C., and the other condition was the same as in Example 1. Regarding the result of this Example, no change was found in the lens surface condition, the deterioration of MTF was 5.8% and was small, and in total evaluation, the lens array is good.

EXAMPLE 3

The lens array of Example 1 was processed in 0.01 N hydrofluoric acid at 20° C., and the other condition was the same as in Example 1. Regarding the result of this Example, no change was found in the lens surface condition, the deterioration of MTF was 2.2% and was small, and in total evaluation, the lens array is good.

EXAMPLE 4

After the treatment with hydrofluoric acid in Example 3, the heat treatment was omitted. Regarding the result of this Example, no change was found in the lens surface condition, the deterioration of MTF was 5.9% and was small, and in total evaluation, the lens array is good.

EXAMPLE 5

A lens array of lenses having a lens diameter of 600 μm was fabricated. The lens end faces of the array were dipped in 0.01 N hydrofluoric acid at 20° C. for 5 minutes, and then heated at 200° C. for 16 hours. Regarding the result of this Example, no change was found in the lens surface condition, the deterioration of MTF was 9.9%, and in total evaluation, the lens array has no problem in practical use.

EXAMPLE 6

The lens array of Example 5 was processed in a mixed acid of 0.01 N hydrofluoric acid and 1 N nitric acid ($HNO_3$) at 20° C., and the other condition was the same as in Example 5. Regarding the result of this Example, no change was found in the lens surface condition, the deterioration of MTF was 6.4% and was small, and in total evaluation, the lens array is good.

COMPARATIVE EXAMPLE 2

The lens array of Example 1 was processed in 2 N hydrofluoric acid at 20° C., but its heat treatment was omitted. The other condition was the same as in Example 1. Regarding the result of this Example, the lens surface condition was worsened and the optical properties of the lens array were impossible to measure. In total evaluation, therefore, the lens array is not good.

COMPARATIVE EXAMPLE 3

The lens array of Example 5, comprising lenses having a lens diameter of 600 μm, was processed not in hydrofluoric acid but in 1 N nitric acid ($NHO_3$) at 30° C. The other condition was the same as in Example 5. Regarding the result of this Example, any significant change was not found in the lens surface condition, but the deterioration of MTF was 16.2% and was large, and in total evaluation, the lens array is not good.

COMPARATIVE EXAMPLE 4

The lens array of Example 1 was processed not in hydrofluoric acid but in 0.1 N acetic acid ($CH_3COOH$) at 30° C. The other condition including heat treatment was the same as in Example 1. Regarding the result of this Example, no change was found in the lens surface condition, but the deterioration of MTF was 18.8% and was large, and in total evaluation, the lens array is not good.

TABLE 1

| | | Lens Diameter (μm) | Treatment Method | Concentration (N) | Liquid Temperature (° C.) | Heat Treatment (after treatment with acid) | Surface Condition after treatment | MTF Deterioration (%) | Total Evaluation |
|---|---|---|---|---|---|---|---|---|---|
| Example | 1 | 300 | HF | 0.0005 | 25 | yes | ○ | 8.1 | ○ |
| | 2 | 300 | HF | 0.02 | 30 | yes | ○ | 5.8 | ○○ |
| | 3 | 300 | HF | 0.01 | 20 | yes | ○ | 2.2 | ○○ |
| | 4 | 300 | HF | 0.01 | 20 | no | ○ | 5.9 | ○○ |
| | 5 | 600 | HF | 0.01 | 20 | yes | ○ | 9.9 | ○ |
| | 6 | 600 | HF (0.01 N) + $HNO_3$ (1 N) | | 20 | yes | ○ | 6.4 | ○○ |
| | 7 | 600 | HF (0.01 N) → $HNO_3$ (1 N) | | 20 | yes | ○ | 7.4 | ○○ |
| Comparative Example | 1 | 300 | — | — | — | yes | ○ | 20.5 | x |
| | 2 | 300 | HF | 2 | 20 | no | x | — | x |
| | 3 | 600 | $HNO_3$ | 1 | 30 | yes | ○ | 16.2 | x |
| | 4 | 300 | $CH_3COOH$ | 0.1 | 30 | yes | ○ | 18.6 | x |

EXAMPLE 7

The lens array of Example 5 was processed in 0.01 N hydrofluoric acid at 20° C. and then in 1 N nitric acid at 20° C., and the other condition was the same as in Example 5. Regarding the result of this Example, no change was found in the lens surface condition, the deterioration of MTF was 7.4% and was small, and in total evaluation, the lens array is good.

COMPARATIVE EXAMPLE 1

Not processed according to the invention, the lens array of Example 1 was tested for weather resistance. Regarding the result of this Example, no change was found in the lens surface condition, but the deterioration of MTF was 20.5% and was large, and in total evaluation, the lens array is not good.

CONCLUSION

Based on the results of Examples and Comparative Examples as above, the condition for the surface protection treatment method of the invention is totally summarized in the following:

After the treatment with hydrofluoric acid, the surface of the lens was analyzed through X-ray photoelectron spectroscopy (XPS), and the presence of fluorine in the lens surface was confirmed. It may be considered that fluorine may adhere to the glass surface as fluoride ion and may bond to Si or alkaline metal existing in the vicinity of the glass surface.

Figure 5A:
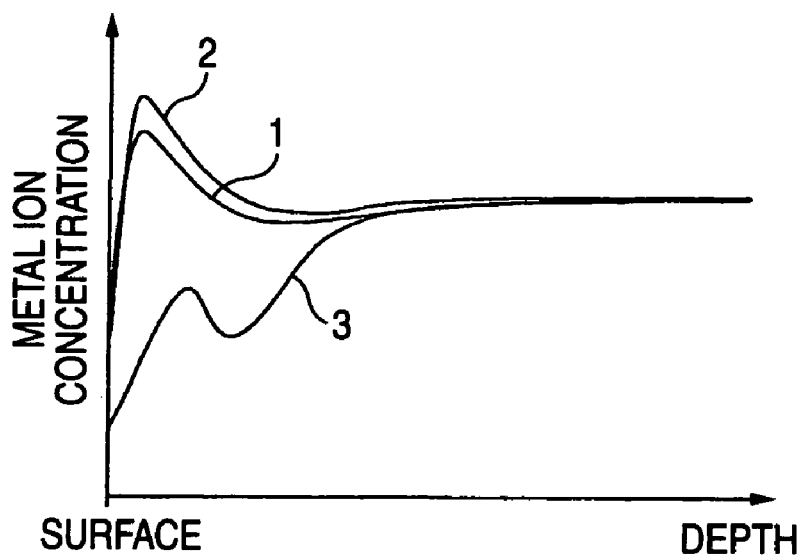
FIGS. 5A and 5B are views showing metal ion concentration distribution in the vicinity of the surface of a glass optical element.

Through XPS, the concentration distribution of Na and Ba was also determined. FIG. 5A shows Na concentration distribution in the vicinity of the glass surface. The curve 1 indicates the data before treatment with hydrofluoric acid, and the curve 2 indicates the data after the treatment. The curve 3 indicates the data after treatment with nitric acid, showing that the Na concentration in the vicinity of the glass surface greatly lowered after the treatment, as compared with that before the treatment. This means Na release through the treatment. As opposed to this, it is understood that the Na concentration distribution inside glass does not substantially change through the treatment with hydrofluoric acid. Specifically, it is understood that the treatment with hydrofluoric acid does not cause releasing of alkaline metal ion from the glass surface but a fluorine-containing layer is formed on the glass surface, and the layer rather prevents releasing of alkaline metal ions from the glass surface.

Figure 5B:
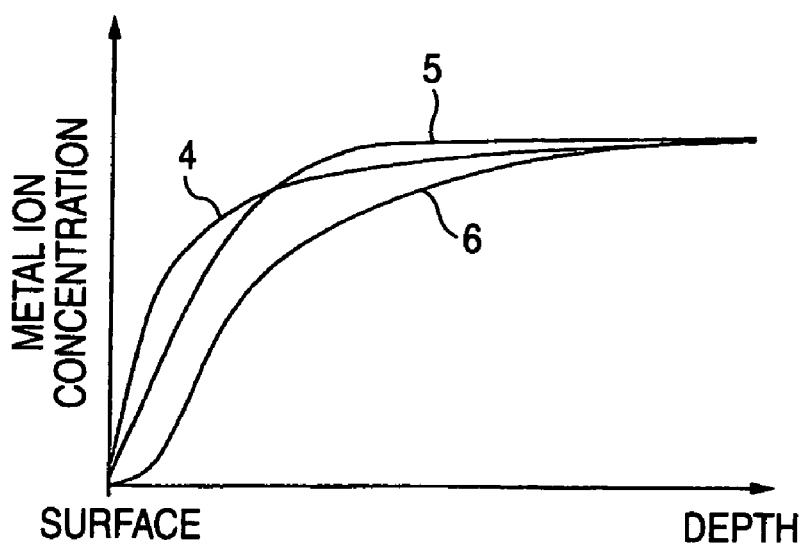

FIG. 5B shows Ba concentration distribution. The curve 4 indicates the data before treatment with hydrofluoric acid, and the curve 5 indicates the data after the treatment. The curve 6 indicates the data after treatment with nitric acid. To the alkaline earth metal Ba, the release effect with acid treatment is not so remarkable as compared with that to alkaline metal. There is found no substantial change in the Ba distribution through the treatment with hydrofluoric acid. Accordingly, the formation of a protective layer through treatment with hydrofluoric acid is effective for preventing the release of alkaline earth metal.

The concentration of hydrofluoric acid suitable for the formation of such a fluorine-containing protective layer may be determined in consideration of the data in Examples 1 to 3 and Comparative Example 2. As in Example 1, when the concentration is 0.0005 normality, then it may be enough, for practical use but the deterioration of MTF is slightly large. This is because, since the fluorine concentration is low, the formation of the protective layer is insufficient to some extent. As in Comparative Example 2, when the concentration is 2 normality, then the acid corrodes glass to such a degree that the processed glass could not be tested for its optical properties. From these results, it is understood that the concentration of hydrofluoric acid is preferably from 0.0005 normality to 1 normality, more preferably from 0.001 normality to 0.05 normality.

As in Examples 3 and 4, it is understood that heat treatment after the treatment with hydrofluoric acid under the same condition is effective for preventing the deterioration of MTF. The experiments show that the heating temperature is preferably 150° C. or higher. If the temperature for the treatment is lower than 150° C., then the treatment is almost ineffective. The uppermost limit in the heat treatment is determined depending on the heat-resisting temperature of the overall structure of the glass optical element. In the above-mentioned Examples, since resin is used in the lens array, the temperature for the heat treatment is preferably not higher than 200° C.

When the lens diameter is large, then the deterioration of MTF may be large to some extent even after treatment with hydrofluoric acid, as in Example 5. In this case, treatment with a mixed acid of hydrofluoric acid and another acid such as nitric acid, or successive treatment with hydrofluoric acid and with another acid may be effective for improving the weather resistance of the glass device, as in Examples 6 and 7. This is owing to the synergistic effect of hydrofluoric acid for protective layer formation and an other acid for alkaline release prevention. This acid other than hydrofluoric acid includes nitric acid as in Examples 6 and 7, and hydrochloric acid, sulfuric acid, and their mixed acids.

The method for forming the fluorine-containing layer is not always limited to the above-mentioned treatment with hydrofluoric acid. Apart from it, herein also employable is a method of depositing a fluorine-containing compound on the glass surface in a vapor phase followed by heating it. However, the layer is limited to one not having any influence on the optical properties of the surface of the optical device.

Needless-to-say, the treatment with hydrofluoric acid as above is effective to a single structure of a graded index rod lens alone. It is applicable to a lens for use in optical fiber collimators. Rod lenses previously treated according to the invention may be arranged to construct a lens array.

In addition, the surface protection treatment method of the invention is effective to the light incident and exit faces of glass optical elements that comprise optical elements, such as glass lenses, prisms, filters.

There is a possibility that the invention is also utilizable in any other industrial field than optical field. For example, the invention will be utilizable in an electronic application filed in which glass having a low alkaline metal content must be used so as to prevent alkaline metal release from glass.

What is claimed is:

1. A glass optical element containing an alkaline metal oxide and an alkaline earth metal oxide, comprising an end portion containing a fluoride ion or a fluorine compound on or in a vicinity of an exposed surface of the glass optical element that is exposed to air, wherein the end portion prevents release of alkaline metal ion or alkaline earth metal ions from the exposed surface.

2. The glass optical element according to claim 1, wherein the end portion is provided in a form of a layer.

3. The glass optical element according to claim 2, wherein the lens is a graded index rod lens.

4. The glass optical element according to claim 1, wherein the glass optical element is a lens.

5. The glass optical element of claim 1 wherein the fluoride ion or fluoride compound is present on the exposed surface in a protective layer that is external to a surface layer.

6. The glass optical element of claim 1 wherein the fluoride ion or fluoride compound is present on the exposed surface in a protective layer that is thinner than a surface layer.

7. A rod lens array comprising:
   a plurality of rod lenses, each having a center axis with a predetermined length and an end face with a predetermined diameter; and
   a pair of frames between which the rods lenses are disposed;
      wherein the rod lenses are so arranged that the end faces of the rod lenses are on a common plane and the center axes of the rod lenses are in parallel with one another, and
   the end face of each rod lens is provided with an end portion containing a fluoride ion or a fluorine compound on or in a vicinity of an exposed surface of the glass optical element that is exposed to an air.

8. The rod lens array according to claim 7, wherein the end portion of each rod lens is provided in a form of a layer.

* * * * *